United States Patent Office 2,750,002
Patented June 12, 1956

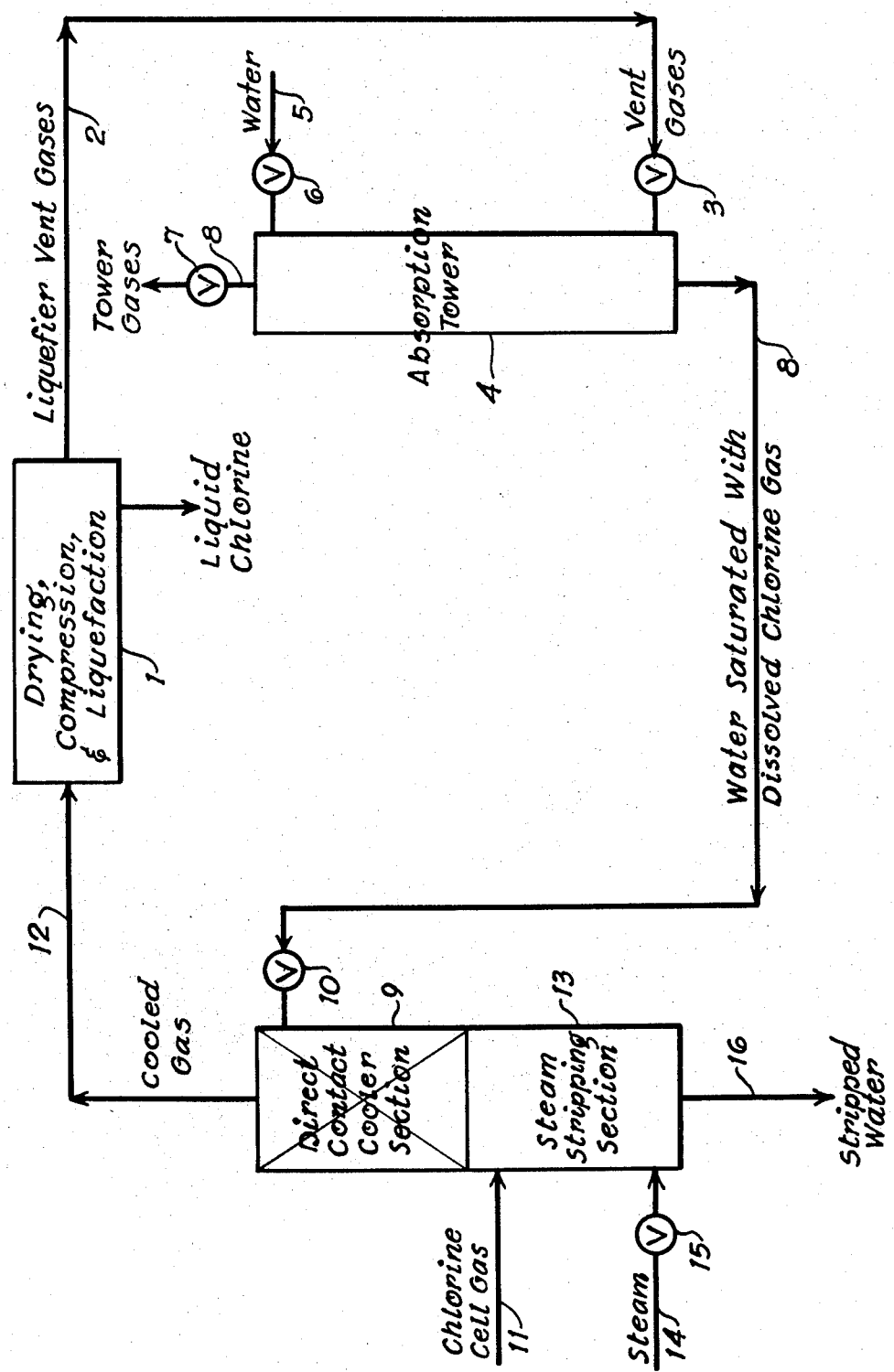

2,750,002
METHOD FOR CHLORINE RECOVERY

Thomas Hooker, Lewiston, and Robert H. Miller, Sanborn, N. Y., assignors to Hooker Electrochemical Company, Niagara Falls, N. Y., a corporation of New York Application November 24, 1953, Serial No. 394,029

6 Claims. (Cl. 183—115)

This invention relates to the recovery of chlorine gas from gases which are less soluble in water than chlorine. More particularly, this invention relates to the recovery of chlorine gas from chlorine liquefier vent or exhaust gases, commonly known as "sniff gas" or "blow gas," resulting from the liquefaction of chlorine by preferential absorption into water solutions at elevated pressures followed by desorption at reduced pressures.

In the liquefaction of chlorine gas produced by commercial electrolytic cells, a certain amount of the gas must be bled off from the liquefiers to remove the so-called non-condensable inert gases which are mainly nitrogen, oxygen, hydrogen, carbon monoxide and carbon dioxide. Bleeding out with these inerts is an amount of chlorine gas which is sufficient to render the vent gas toxic to plant and animal life, corrosive and odiferous, such that in many cases the bleeding off of these gases into the air has caused an objectionable air pollution problem. In addition, chlorine lost in these vent gases normally amounts to 1 to 5 per cent of the plant production. Thus, in a chlorine-caustic plant manufacturing 125 tons per day of chlorine, the loss of chlorine in the liquefier vent gases alone is from about 1.25 to about 6.25 tons per day. This is an appreciable loss and would amount to additional earnings for the plant if this chlorine could be recovered in saleable form and would also obviate the objectionable discharge of chlorine into the atmosphere.

In the past, various methods have been suggested and used for recovering this chlorine. Some of them include the direct use of the chlorine in this waste gas to manufacture saleable by-products such as hydrogen chloride, sulfur chloride and chlorinated organics. This vent gas has also been converted into disposable by-products such as alkali chlorides. In some cases, absorption in solvents such as stannic chloride or a chlorinated organic compound, such as carbon tetrachloride, has been employed for chlorine recovery. Further, this chlorine in the vent gas has been recovered from water by cooling to near zero degree centigrade temperatures to form chlorine monohydrate crystals and the chlorine recovered therefrom by filtration, followed by vaporization. Such methods have involved substantial operating costs and have shown low or negative returns on a sizeable investment. Further, where saleable by-products have been manufactured, the relatively small volume of production at these special operating conditions has often created a problem in marketing the product. Thus, a better, more economical method of chlorine recovery from the liquefier vent gas has been needed.

We have now found that chlorine gas from gaseous mixtures containing chlorine gas and carbon dioxide gas can be recovered by the method which comprises: passing the chlorine vent gases into contact with water maintained at a temperature above 10 degrees centigrade in an absorption system, maintaining the partial pressure of the carbon dioxide in the absorption system below 1.5 atmospheres absolute; absorbing into water at a super-atmospheric pressure the chlorine gas contained in the vent gases to form a chlorine-water solution; withdrawing from the absorption system the chlorine-water solution; desorbing the chlorine gas from the chlorine-water solution by reducing the pressure thereon; and recovering the chlorine therefrom.

It is indeed surprising that this method for recovering chlorine from liquefier vent gas is adaptable on a commercial scale, in view of the known explosion hazard involved in handling this gas, which usually contains substantial amounts of residual hydrogen and oxygen. Further, it is also surprising to find this method commercially adaptable in view of the known information that chlorine has a low solvency in water at near atmospheric pressures, thereby necessitating large or excessive quantities of water in order to effect the efficient absorption of chlorine from the vent gas. Further, since carbon dioxide has not an appreciable solubility in water as compared with chlorine, it was believed that the carbon dioxide would actually lower the effective solubility of the chlorine because of the common ion effect which might develop since both of these gases hydrolyze when in water. In addition, it was thought that the carbon dioxide might cause many problems in the ultimate recovery of the desorbed chlorine since the carbon dioxide also would be desorbed along with the chlorine and make drying, compression and liquefaction of the chlorine more difficult and costly.

However, it has been found that when operating within the disclosed conditions of this invention chlorine gas can be absorbed in water, including water solutions such as brine, under pressure in a packed absorption tower and the inert tower gases vented to the atmosphere with substantially no problems of explosion between the hydrogen and oxygen which remain in the vented absorption tower gases; that there is no excessive absorption and desorption of carbon dioxide gas and the chlorine gas may may thus be recovered after desorption by drying, compression and liquefaction without appreciable increase in operation and equipment expense; that there is no noticeable depression in chlorine absorption caused by the common ion effect of the carbon dioxide which is absorbed with the chlorine in the water; and that the water requirements necessary for chlorine absorption are not large or expensive. In fact, we have found the carbon dioxide recycle actually reduces explosion hazard. Other advantages will become apparent to those skilled in the art as the invention is more fully described below.

The process of this invention is particularly adaptable for use in those commercial electrolytic chlorine-caustic installations which use direct contact cooling of the warm chlorine cell gas with water followed by steam stripping to recover chlorine remaining in the water, for it has been found that the water used to absorb the chlorine from the liquefier vent gas is adaptable for use in the direct contact cooling of this warm cell gas. In this type of installation, the chlorine absorbed in this water is desorbed by flashing, i. e., releasing the pressure on the chlorine-water solution, into the direct contact cooling section and further desorbed in the stream stripping section, respectively, of the direct contact cooling units.

This invention will be more fully described with reference to the figure, which is a diagrammatic flow sheet of a preferred embodiment of this invention, but it is not to be construed as limited thereto, except as defined by the appended claims. Liquefier vent gases are exhausted from the chlorine drying, compression and the liquefaction system 1 and sent through line 2, check valve 3 and introduced near the bottom into a packed absorption tower 4 which is maintained at a pressure substantially equal to or slightly less than exhaust pressure of the drying, compression and liquefaction system 1. The absorption tower 4 is maintained at pressures greater than atmospheric pressure but less than the pressure where the partial pressure of the carbon dioxide in the absorption tower 4 is 1.5 atmospheres absolute, by valve 7 which controls the venting through line 8. Water, including aqueous solutions such as brine, above 10 degrees centigrade is introduced at a point at or near the top of the absorption tower 4 through line 5 controlled by valve 6, passes down over the packing, and comes in contact with the up-flowing vent gases. Under elevated pressure the chlorine in the vent gases is preferentially absorbed by the water along with appreciable amounts of carbon dioxide. The non-absorbed tower gases containing hydrogen, oxygen, nitrogen, carbon monoxide and most of the carbon dioxide are exited to the atmosphere out of the absorption tower 4 at or near the top through line 8 controlled by valve 7. These gases are free from chlorine odor. The water, substantially saturated with chlorine gas, passes out of the absorption tower 4 at or near the bottom through line 8 and into a direct contact cooler section 9 at or near the top of a tower controlled by valve 10. The direct contact cooler section 9 operates at about atmospheric pressure and is used to cool the warm chlorine-containing cell gases entering through line 11. The chlorine-water solution from the absorption tower 4 is flashed into the direct contact cooler section 9 by releasing the pressure on the chlorine-water solution, and mixes with the cooled cell gases and these wet mixed gases pass out of the direct contact tower section 9 through line 12 into the drying, compression and liquefaction system 1 where the liquid chlorine is produced as a saleable product. The water from the direct contact cooler section 9 passes down into a steam stripping section 13 of the tower or into a separate steam stripping tower where steam entering through line 14 controlled by valve 15 strips out the remaining amounts of chlorine from the water before this water passes out the bottom through line 16. This warm water may be discarded or used as hot process water.

Alternatively, more than one absorption tower may be used in effecting the process of this invention and the water may be re-cycled and used as feed in any or all of the absorption towers used. Also, the water passing out of the direct contact cooler section 9 and containing small amounts of absorbed residual chlorine, instead of being steam stripped, alternatively may be used in other processes as such, or may be re-cycled as feed to the absorption tower 4, for instance, through line 5 controlled by valve 6, for re-use. In the latter case, however, an intermediate flash tank may be necessary before feeding the water back into the absorption tower 4. Instead of the chlorine water solution from the absorption tower 4 being flashed into the direct contact cooler section, it may be separately flashed in a flash tank, not shown. The liquid stream from this flash tank may be re-cycled as feed to the absorption tower 4 in which case it may be introduced into the tower, for instance, through line 5 controlled by valve 6 or at a point in the tower between the inlet for line 5 and the point of introducing the vent gases, or, it may be used as the coolant in the direct contact cooling section 9, or, it may be split and used both as re-cycle feed and coolant, or, it may be withdrawn for other uses. The gaseous stream from this flash tank is sent directly to the drying, compression, liquefaction section 1, or, may be combined with the cell gases either during or after cooling in the direct contact cooling section.

We have found that this invention is also adaptable to those commercial electrolytic chlorine-caustic installations which use methods other than the direct contact cooling of the warm chlorine cell gas. In fact, the chlorine can be desorbed from the chlorine-water solution exiting from the absorption tower at a lower pressure by any of the known pressure-reduction gaseous desorption methods. Such gaseous desorption methods include releasing the pressure on the chlorine-water solution in any suitable container such as a flash tank or tower and thereby releasing the chlorine gas from the chlorine-water solution. This recovered chlorine gas would then be used directly in other processes or would be further processed by drying, compression and liquefaction to recover the liquid chlorine as a saleable product. The water, having been desorbed of most of its chlorine content, would then be further stripped of its remaining chlorine by steam stripping to reduce the chlorine content to a satisfactory extent so that the water can be discharged to a suitable disposal point, or the water may be re-used as such in another process such as the direct contact cooling of warm cell gases described above, or may be re-cycled as feed to the absorption tower water inlet for re-use with or without cooling.

In accordance with our invention, the water, including water solutions, in the chlorine absorption tower must be maintained above a temperature of 10 degrees centigrade. The chlorine upon absorption and hydrolysis in the water, if cooler than 10 degrees centigrade, may form crystalline chlorine monohydrate and thereby cause plugging within the tower and the liquid exit lines. Ordinary water temperatures above 10 degrees centigrade and below 100 degrees centigrade may be used but it has been found that temperatures between 12 and 30 degrees centigrade are preferred, for when operating at temperatures above about 30 degrees centigrade the chlorine solubility in water decreases markedly and may require excessive water consumption.

The pH or hydrogen ion concentration of the water in the chlorine absorption tower has some effect on the amount of the chlorine which a given amount of water will absorb, all other absorption conditions being constant. However, this effect does not noticeably alter the operating conditions except when the pH of the water goes above 9.5 or below 3.0. When the pH is too high, the chlorine may be chemically reacted to a soluble form which is not recoverable as free chlorine by simple pressure reduction; when the pH is too low, the common ion effect of the hydrogen ion concentration may prevent the hydrolysis of the chlorine and thereby reduce its overall solubility, thus necessitating a higher ratio of water to gas in the chlorine absorption system.

The pressure of the chlorine absorption tower must be high enough above the pressure of the chlorine desorption tower (for instance, the direct contact cooler and steam stripper tower used to cool and strip the warm chlorine-containing cell gases) so that a substantial amount of chlorine can be absorbed and desorbed per pound of water used. It is preferred to operate the chlorine absorption tower at substantially the outlet pressure of the chlorine compression and liquefaction system or slightly lower, for example 33 pounds per square inch gauge when using a vent gas feed to the absorber containing about 23 per cent chlorine and a water temperature of about 27 degrees centigrade. It has been found that with carbon dioxide present in the vent gas feed to the absorber, the absorption becomes less selective for chlorine when the partial pressure of the carbon dioxide in the absorption tower exceeds 1.5 atmospheres absolute. However, subject to these limitations chlorine absorption tower higher pressures may be used without departing from the scope of this invention. We prefer to use an operating pressure as high as practical, dependent on commercially-available equipment so that the partial pressure of the chlorine gas in the feed gas to the absorption system is as high as possible and yet have the partial pressure of the carbon dioxide below 1.5 atmospheres absolute. In general, when using gases containing from 15 to 60 per cent chlorine any elevated pressure can be used provided the partial pressure of the carbon dioxide does not exceed 1.5 atmospheres absolute. These pressures may range from a few pounds above atmospheric pressure to as high as 150 p. s. i. g. We prefer to operate the absorption system for the chlorine liquefier vent gases between pressures of about 10 p. s. i. g. and 100 p. s. i. g.

provided the operating pressure is below the exhaust pressure of the liquefiers and the partial pressure of the carbon dioxide in the gas is below 1.5 atmospheres absolute.

The ratio of water to liquefier vent gas feed is dependent on the design conditions of the chlorine absorption tower and for optimum operation should be proportioned to the feed vent gas flow. An excess of water increases operating costs in the stripping section of the desorption tower and results in unnecessary absorption and re-cycle of carbon dioxide gas into the drying, compression and liquefaction system. Further, under special conditions, excessive carbon dioxide absorption can result in explosive gaseous mixtures being formed in the chlorine absorption tower. On the other hand, a deficiency of water will result in incomplete chlorine absorption and, thus, a loss of valuable product and creation of a fume nuisance.

Under the preferred operating conditions of this invention, carbon dioxide is also absorbed in appreciable amounts in the absorption system, where it re-cycles through the process and thereby builds up and finally reaches an equilibrium concentration. The amount of carbon dioxide absorbed and re-cycled at 25 degrees centigrade can be estimated by the following formula when the partial pressure of carbon dioxide gas does not exceed 1.5 atmospheres:

$$R = \frac{MVPF}{HC - PF}$$

$R$ = pound moles of carbon dioxide re-cycled per hour
$M$ = pound moles of total gas vented from the chlorine absorption tower per hour (chlorine free)
$V$ = mole fraction of carbon dioxide in the chlorine absorption tower vent gas (chlorine free)
$P$ = total pressure at the chlorine absorption tower water exit in atmospheres absolute
$F$ = mole fraction of chlorine entering the chlorine absorption tower
$H$ = Henry's law constant for carbon dioxide
$C$ = Solubility of chorine in water
} Under water exit conditions of the chlorine absorption tower H and C can be evaluated from published data when the carbon dioxide partial pressure does not exceed 1.5 atmospheres. This formula is derivable by material balances assuming complete chlorine absorption and carbon dioxide saturation following Henry's law. Under normal circumstances the carbon dioxide re-cycle increases the chlorine absorption tower duty 20 to 30 per cent over that calculated without re-cycle, but its effect on the necessary capacity of the drying, compression and liquefaction system is negligible, amounting to less than 1.5 per cent of the total gas entering the system.

It has also been noted that under the preferred operating conditions of this invention, the chlorine concentration in the water has little effect on the absorption of carbon dioxide and, likewise, the effect of carbon dioxide concentration in the water on chlorine absorption is small.

The chlorine absorption tower may be constructed from any of the usual standard materials of construction used for handling wet chlorine, carbon dioxide and the required internal pressures. Examples of these are glass, Pyrex, rubber or plastic-lined steel. Packed, spray or plate towers may be used in this invention, although packed towers are usually preferred. The packing may be made of any material which provides adequate distribution and surface characteristics and is resistant to wet chlorine and carbon dioxide, for example, one-inch ceramic ring packing.

It is to be understood that the water solvent used in the process of this invention may also contain other chemicals including dilute solutions of chlorine dissolved therein. Ordinary river water, well water, lake water, brackish water, salt water, including brine, treated or untreated, and other similar aqueous mediums are all considered to be within the scope of the word "water" used in this disclosure and the appended claims.

In practicing the method of the present invention, the chlorine-containing gas stream from which it is desired to recover substantially all of the chlorine may be obtained from any of several suitable sources. Examples of such gas mixtures which may be suitably employed as the gaseous mixture to be processed in accordance with this invention are those issuing from electrolytic cells employed in the electrolysis of sodium chloride brine in the commercial production of caustic soda and chlorine from sodium chloride; the exhaust gases from a reactor in which hydrogen chloride is oxidized to elemental chlorine and water, as in the Deacon reaction; the exhaust gases issuing from the chlorination of organic materials such as the exhaust gases issuing from the substitution of chlorine in organic compounds which gases usually contain appreciable quantities of elemental chlorine; or any other gaseous mixture containing a quantity of chlorine which is desired to be recovered. Although we have described our invention with particular emphasis on recovering chlorine from the liquefier vent gases produced in commercial electrolytic chlor-alkali plants, the other gaseous mixtures may be similarly processed but may require pre-treatment before being introduced into our system in order to remove objectionable materials which would interfere with the desirable physical processing which takes place in our absorption system. For example, exhaust gases containing hydrogen chloride would necessarily be pre-treated to remove the HCl before processing the chlorine-containing gas in accordance with our invention. Other gases more soluble in water than chlorine gas would, likewise, have to be removed before processing the chlorine-containing gas in accordance with our findings. Also, if the exhaust gases were not available at a suitable super-atmospheric pressure, necessary to effect the absorption of chlorine in accordance with our invention, then the exhaust gases would have to be compressed before introduction into our absorption system. Further, it is to be understood that the process of this invention can be used for the absorption of chlorine gas from other gases less soluble in water than chlorine gas and containing carbon dioxide, and we do not wish to be limited to any specific gaseous compositions except as defined in the appended claims. The gas may contain from a negligible amount to substantially 100 per cent chlorine and have contained therein one or more of a number of gases which are less soluble in water than chlorine. Such less soluble gases would include with carbon dioxide, hydrogen, oxygen, nitrogen, carbon monoxide, methane, ethane, ethylene, selected chlorinated organic compounds and other inorganic and organic chemical gases which are less soluble in water than chlorine gas and non-reactive with chlorine under our absorption conditions.

The following example is illustrative of specific practice embraced within the scope of our invention, but is not to be construed as limiting:

*Example*

Chlorine liquefier vent gases, from the drying, compression and liquefaction section of a commercial installation for manufacturing chlorine by the electrolysis of sodium chloride in deposited diaphragm type cells, having the following approximate composition; 23 per cent chlorine, 25 per cent carbon dioxide, and 42 per cent inert gases comprising atmospheric gases such as nitrogen and oxygen and cell gases such as hydrogen, carbon monoxide and traces of other gases usually present in such systems, is introduced at the rate of about 14 pound moles per hour into an absorption tower approximately 30 feet in height and 42 inches in diameter packed with Raschig rings. Water at the rate of about 3300 pound moles per hour is introduced into the absorption tower near the top at about 21 degrees centigrade. The absorption tower is maintained at about the pressure of the compression and liquefaction system which in this case is approximately 3 atmospheres absolute. The liquefier exhaust gases pass up through the packing coming in contact with the water flowing down over the packing and the chlorine is absorbed into the water along with some carbon dioxide. The non-absorbed gases are then vented to the atmosphere and are composed of the atmospheric inerts, cell gases including carbon dioxide and traces of other gases. These vented gases are free of all chlorine odor. The liquid effluent withdrawn from the bottom of the tower which is saturated with dissolved chlorine gas, that is, containing about 4000 parts of chlorine per million parts of water, is introduced into the top of the direct contact cooling tower used for cooling the warm chlorine cell gas from the deposited diaphragm type electrolytic cells. The direct contact cooling tower is maintained at about atmospheric pressure; thus, the liquid effluent from the absorption tower is reduced from a pressure of about 3 atmospheres to about one atmosphere and most of the chlorine and carbon dioxide contained in the water is flashed off as gaseous chlorine and carbon dioxide. This chlorine cell gas analyzing approximately 95 per cent chlorine, 1.5 per cent carbon dioxide, 1.0 per cent oxygen, 2.2 per cent nitrogen and 0.3 per cent hydrogen and saturated with water enters the bottom of the direct contact cooling tower at a temperature between 80 and 98 degrees centigrade and passes up through the packing at the rate of about 176 pound moles per hour coming in contact with the relatively cool water flowing down over the packing. These chlorine cell gases leave the packing cooled and combined with the relatively small amount of flashed gaseous chlorine and carbon dioxide from the absorption tower liquid effluent and are removed from the top of the direct contact cooling tower for drying, compresssion and liquefaction. The water leaves the bottom of the packing of the direct contact cooling tower at about 82 degrees centigrade and passes into a steam stripping tower where residual chlorine is stripped from the water with live steam at about 100 degrees centigrade. The hot vapors of steam and chlorine gas are combined with the warm chlorine cell gases to be introduced into the direct contact cooling tower and the steam stripped water is sent to a point of disposal.

In a manner after the foregoing example at about the 3 atmospheres' pressure depicted, a liquefier vent gas containing 60.4 per cent chlorine, 9.4 per cent carbon dioxide, 14.5 per cent oxygen and 15.7 per cent inerts has been successfully processed by passing the gases in contact with water in an absorption system to give an exit gas which is free from all chlorine odor, that is, which contains less than 2 parts of chlorine per million parts of vent gases. In still another instance, a liquefier vent gas containing 56.9 per cent chlorine, 7.1 per cent carbon dioxide, 13.0 per cent oxygen and 23.0 per cent inerts was similarly processed under substantially the same conditions of the example to give an exit gas which is free of chlorine odor. A liquefier vent gas containing 23.5 per cent chlorine, 60.7 per cent carbon dioxide, 6.8 per cent oxygen and 9.0 per cent inerts if processed in accordance with the example under the 3 atmospheres' pressure depicted will give a vent gas which is free from chlorine odor; however, $CO_2$ re-cycle would be excessive in a closed cycle. This gas may be economically processed in accordance with our invention by dilution with selected gases such as air or chlorine so that the partial pressure of carbon dioxide in the system is below 1.5 atmospheres.

It is apparent from the foregoing Examples in the specification that vent gases containing various proportions of chlorine and carbon dioxide may be successfully processed in accordance with our invention.

We claim:

1. A method for the recovery of chlorine gas from gaseous mixtures containing chlorine and carbon dioxide which comprises: passing such gaseous mixture into contact with water maintained at a temperature above 10 degrees and below 100 degrees centigrade in an absorption system; maintaining the partial pressure of the carbon dioxide in the absorption system below 1.5 atmospheres absolute; absorbing into water at a super-atmospheric pressure between about 10 to about 150 p. s. i. g. total absorption pressure the chlorine gas contained in the gaseous mixture to form a chlorine-water solution; withdrawing from the absorption system the chlorine-water solution; desorbing the chlorine gas from the chlorine-water solution by reducing the pressure thereon; and recovering the chlorine therefrom.

2. The method of claim 1 wherein the desorption of the chlorine gas from the chlorine-water solution is effected by flashing the said chlorine-water solution into a container maintained at a pressure less than the pressure maintained in the said absorption system.

3. The method of claim 2 wherein the flashed chlorine-water solution, having been desorbed of dissolved chlorine by flashing into a container, is re-cycled to a chlorine absorption system.

4. The method of claim 2 wherein the desorption of the chlorine gas from the chlorine-water solution is effected by flashing, followed by steam-stripping substantially all the chlorine from the flashed chlorine-water solution.

5. A method for the recovery of chlorine gas from chlorine liquefier vent gases produced in commercial electrolytic chlor-alkali plants, containing chlorine and carbon dioxide which comprises: passing the vent gas from said chlorine liquefier into contact with water maintained at a temperature above 10 degrees and below 100 degrees centigrade in an absorption system; maintaining the partial pressure of the carbon dioxide in the absorption system below 1.5 atmospheres absolute; absorbing into water at a super-atmospheric pressure the chlorine gas contained in the liquefier vent gases to form a chlorine-water solution; withdrawing from the absorption system the chlorine-water solution; desorbing chlorine gas from said withdrawn solution by flashing said solution at about atmospheric pressure into a direct contact cooling unit used to cool warm chlorine cell gases entering the cooling unit as a separate stream; and recovering the chlorine therefrom.

6. The method of claim 5 wherein the desorption of chlorine gas from the chlorine-water solution is effected by flashing, followed by steam stripping at about atmospheric pressure substantially all the chlorine from the water.

References Cited in the file of this patent

UNITED STATES PATENTS

| | | |
|---|---|---|
| 2,185,989 | Roberts | Jan. 2, 1940 |
| 2,447,834 | Balcar | Aug. 24, 1948 |
| 2,540,905 | Neubauer et al. | Feb. 6, 1951 |

FOREIGN PATENTS

| | | |
|---|---|---|
| 353,704 | Great Britain | July 30, 1931 |

OTHER REFERENCES

Publication: "Solubilities of Inorganic and Organic Compounds," by A. Seidell, vol. 1, 2nd edition; Van Nostrand Co.; pages 227 and 245 thereof.